US008598072B2

(12) United States Patent
Sato et al.

(10) Patent No.: US 8,598,072 B2
(45) Date of Patent: Dec. 3, 2013

(54) MERCURY-REMOVAL ADSORBENT, METHOD OF PRODUCING MERCURY-REMOVAL ADSORBENT, AND METHOD OF REMOVING MERCURY BY ADSORPTION

(75) Inventors: Kazuo Sato, Ibaraki (JP); Hiromitsu Shibuya, Ibaraki (JP)

(73) Assignee: JGC Corporation, Tokyo (JP)

( * ) Notice: Subject to any disclaimer, the term of this patent is extended or adjusted under 35 U.S.C. 154(b) by 794 days.

(21) Appl. No.: 12/312,993

(22) PCT Filed: Dec. 14, 2007

(86) PCT No.: PCT/JP2007/074597
§ 371 (c)(1),
(2), (4) Date: Jun. 3, 2009

(87) PCT Pub. No.: WO2008/072788
PCT Pub. Date: Jun. 19, 2008

(65) Prior Publication Data
US 2010/0025302 A1    Feb. 4, 2010

(30) Foreign Application Priority Data

Dec. 15, 2006   (JP) .................................. 2006-338978

(51) Int. Cl.
*C01B 31/08*    (2006.01)
*B01D 53/56*    (2006.01)

(52) U.S. Cl.
USPC ........................................................ 502/413

(58) Field of Classification Search
None
See application file for complete search history.

(56) References Cited

U.S. PATENT DOCUMENTS

| | | | | |
|---|---|---|---|---|
| 3,873,581 | A | * | 3/1975 | Fitzpatrick et al. ............ 552/234 |
| 4,615,806 | A | | 10/1986 | Hilton |
| 4,889,698 | A | * | 12/1989 | Moller et al. .................. 423/210 |
| 5,062,948 | A | * | 11/1991 | Kawazoe et al. .......... 208/251 R |
| 5,202,301 | A | | 4/1993 | McNamara |
| 5,336,835 | A | | 8/1994 | McNamara |
| 5,510,565 | A | | 4/1996 | Tan et al. |
| 7,722,705 | B2 | * | 5/2010 | Gadkaree et al. ................ 95/134 |
| 2002/0198097 | A1 | * | 12/2002 | El-Shoubary et al. ........... 502/56 |
| 2003/0206843 | A1 | | 11/2003 | Nelson, Jr. |
| 2004/0180788 | A1 | * | 9/2004 | Khalili et al. .................. 502/417 |
| 2005/0100699 | A1 | * | 5/2005 | Durante et al. ............... 428/36.2 |
| 2007/0265161 | A1 | * | 11/2007 | Gadkaree et al. .............. 502/417 |

FOREIGN PATENT DOCUMENTS

| | | |
|---|---|---|
| EP | 0 433 677 | 6/1991 |
| JP | 61-209053 | 9/1986 |
| JP | 3-28295 | 2/1991 |
| JP | 3-213144 | 9/1991 |
| JP | 2602361 | 9/1991 |
| JP | 7-228874 | 8/1995 |
| JP | 2005-524769 | 8/2005 |
| JP | 2005-349364 | 12/2005 |
| WO | WO-03/092861 | 11/2003 |

OTHER PUBLICATIONS

Calgon Carbon Corp.: "Calgon Carbon HGR-LH (TM)—Impregnated Activated Carbon" 2004, pp. 1-2, XP002561156; Pittsburgh Retrieved from the Internet: URL:http://www.coastalchem.com/PDFs/Calgon/HGR-LH.pdf> [retrieved on Dec. 14, 2009] p. 1 p. 2, col. 3, paragraph 3.
Lee S J; Seo Y-C; Juring J; Lee T G: "Removal of gas-phase elemental mercury by iodine- and chlorine-impregnated activated carbons" Atmospheric Environment, vol. 38, No. 39, Sep. 2004, pp. 4887-4893, XP002561157; ISSN: 1352-2310 DOI: 10.1016/j.atmosenv.2004.05.043 Section "2. Experimental, 2.1 Treatment of the carbon"; p. 4888, col. 2, paragraph 2-p. 4889, col. 1, paragraph 2 reaction equations (1) to (5); p. 4891, col. 2.
Calvo et al: "Carbon foams from coals. A preliminary study" Fuel, IPC Science and Technology Press, Guildford, GB, vol. 84, No. 17, Dec. 1, 2005, pp. 2184-2189, XP005114450 ISSN: 0016-2361 p. 2189; figure 6.
Liu W; Vidic R D; Brown T D: "Optimization of Sulfur Impregnation Protocol for Fixed-Bed Application of Activated Carbon-Based Sorbents for Gas-Phase Mercury Removal" Environmental Science & Technology, vol. 32, No. 4, Feb. 15, 1998, pp. 531-538, XP002561158 ISSN: 0013-936X DOI: 10.1021/es970630+ p. 534, col. 2, paragraph 3.
Van Brakel J; Modry S; Svata M: "Mercury Porosimetry: State of the Art" Powder Technology, vol. 29, No. 1, Jun. 30, 1981, pp. 1-12, XP002561159; ISSN: 0032-5910 DOI: 10.1016/0032-5910(81)85001-2 p. 2, col. 1, paragraph 2.

* cited by examiner

*Primary Examiner* — Melvin C Mayes
*Assistant Examiner* — Sheng H Davis
(74) *Attorney, Agent, or Firm* — Jordan and Hamburg LLP

(57) ABSTRACT

To provide mercury-removal adsorbents, a method of producing mercury-removal adsorbents, and a method of removing mercury by adsorption which are capable of realizing efficient removal of mercury by adsorption from liquid hydrocarbon, thermal power station exhaust combustion gas, natural gas, off gas of various process plants, and so on which contain mercuries in various forms such as elemental mercury, ionic mercury, and organic mercury, and a concomitant hindering mercury adsorption.
Mercury-removal adsorbents carrie potassium iodide in an amount of 27 to 70% of a total adsorbent weight, and a volume of pores with a 1 μm pore diameter or more in the mercury-removal adsorbents is 0.6 mL/g or more. These mercury-removal adsorbents are filled in, for example, an adsorption tower 10, and a hydrocarbon liquid is passed therethrough (mercury removal step). In a case where the hydrocarbon liquid contains saturated water, a dehydration unit 9 or the like is installed on a preceding stage of the adsorption tower 10 to dehydrate the hydrocarbon liquid (dehydration step).

7 Claims, 2 Drawing Sheets

MERCURY-REMOVAL ADSORBENT, METHOD OF PRODUCING MERCURY-REMOVAL ADSORBENT, AND METHOD OF REMOVING MERCURY BY ADSORPTION

TECHNICAL FIELD

The present invention relates to mercury-removal adsorbents, a method of producing mercury-removal adsorbents, and a method of removing mercury by adsorption from mercury-containing gas or liquid, for example, liquid or gaseous hydrocarbon and exhaust combustion gas.

BACKGROUND ART

Relatively light hydrocarbon liquids (crude oil, natural gas condensate (hereinafter, referred to as condensate), natural gas, and the like) produced from wells and exhaust combustion gas sometimes contain mercury or a mercury compound. However, in plants for natural gas processing, petroleum refining, and petrochemistry, since mercury contained in a hydrocarbon liquid is likely to corrode apparatuses made of aluminum-based materials and to poison precious metal catalysts, it is necessary to lower the mercury concentration in a processed liquid to a very low value.

Hydrocarbon liquids contain various kinds of mercury such as ionic mercury (for example, "RS—Hg—SR" and the like) and organic mercury (for example, "R—Hg—R" and the like") as well as elemental mercury, and actually, ionic mercury is contained in many cases.

The simplest and most realistic method for removing mercury contained in a hydrocarbon liquid is adsorptive removal using mercury-removal adsorbent. However, the use of this method for removing mercury contained in a hydrocarbon liquid has the following problems: (1) ionic mercury and organic mercury have far lower adsorptivity to mercury-removal adsorbent than elemental mercury; (2) A hydrocarbon liquid contains heavy hydrocarbon which lowers adsorptivity of mercury; and (3) A hydrocarbon liquid contains a third component exhibiting very strong adsorptivity to mercury-removal adsorbent, and the strong adsorptivity of the third component often hinders the originally intended mercury adsorption. In such cases, a conventional adsorption method using metal sulfide (molybdenum sulfide, copper sulfide, or the like) as mercury-removal adsorbent has a great difficulty in lowering the mercury concentration to a very low value on the 1 wtppb order. Lowering the concentration, even if possible, is not practical due to a short life of an adsorption tower. An adsorption method capable of removing such adsorption-resistant ionic mercury and the like would have a great commercial value.

As attempts to thus removing mercury by adsorption in liquid hydrocarbon, there have been proposed mercury-removal adsorbents (patent document 1) including activated carbon carrying metal halide such as potassium iodide in an amount of 0.5 to 25 wt % of the total adsorbent weight, and mercury-removal adsorbents (patent document 2) using activated carbon with a 50 to 70% water retention rate, thereby setting an amount of metal halide carried to 25 wt % or more of the total adsorbent weight.

In general, to avoid the aforesaid corrosion of the aluminum-based materials and poisoning of the precious metal catalysts, the adsorptive removal need to lower the concentration of mercury in liquid hydrocarbon to 1 wtppb or lower. However, as a result of tests, neither of the aforesaid mercury-removal adsorbents was able to exhibit results satisfying the specification value, that is, the mercury concentration of 1 wtppb or lower in liquid hydrocarbon. Incidentally, the patent document 1 reports that its mercury-removal adsorbents were able to lower the mercury concentration in hydrocarbon to less than 3 wtppb which is the lowest detection limit of mercury in this test, but this does not guarantee the aforesaid specification value at all.

Patent Document 1
   Japanese Patent Publication No. 2602361: Table IV, Table V

Patent Document 2
   Japanese Patent Application Laid-open No. 2005-349364; Table 1

DISCLOSURE OF THE INVENTION

The present invention was made under such circumstances, and the objective thereof is to provide mercury-removal adsorbents, a method of producing mercury-removal adsorbents, and a method of removing mercury by adsorption which are capable of realizing adsorptive removal of not only elemental mercury but also mercury in various forms such as ionic mercury and organic mercury. It is difficult to adsorptively remove ionic or organic mercury using ordinary mercury adsorbents, from gases and liquids such as hydrocarbon liquids and exhaust combustion gas.

In an effort to realize the adsorptive removal of not only elemental mercury but also ionic mercury and organic mercury which can not be removed easily due to the low reactivity of those mercury compounds with the active substances on the adsorbents, the present inventors found and studied a method of using an activated carbon support or the like on which potassium iodide is impregnanted. Potassium iodide has a strong chemical bond even with ionic mercury and organic mercury. Generally, the amount of adsorbed mercury per unit weight of adsorbent tends to increase with an increase in the amount of potassium iodide impregnanted on activated carbon support. The present inventors found a phenomenon which is somewhat inconsistent to this tendency and continued further study focusing on this phenomenon, and as a result, found out that adsorption performance is strongly dependent upon pore volume of the support material, and have reached the present invention.

Specifically, in a conventional activated carbon support, a phenomenon was found that, with an increase in an amount of potassium iodide carried, pores of the activated carbon support are closed, which prevents the activated carbon support from exhibiting sufficient mercury removal performance. As a result of the comprehensive research of these problems, the present inventors found that such a decrease in a mercury adsorption amount is prevented when a support, even if carrying a necessary amount of potassium iodide, has a certain amount of pore volume or more and that this is correlated to an optimum amount of potassium iodide carried as an adsorbent, and consequently, the present invention was completed. From another point of view, an activated carbon support was found whose micropores are not filled/closed by carried potassium iodide.

In a mercury-removal adsorbent including an activated carbon support carrying potassium iodide to adsorptively remove mercury according to the present invention, an amount of the potassium iodide carried is 5 to 70% of a total adsorbent weight, and a volume of pores with a 1 μm pore diameter or more in the mercury-removal adsorbent is 0.6 mL/g or more. More preferably, the amount of the potassium iodide carried is 27 to 70% of the total adsorbent weight.

In a method of producing a mercury-removal adsorbent which include an activated carbon support carrying potassium iodide to adsorptively remove mercury of the present invention, the method includes the step of making the activated carbon support having a 1.0 mL/g volume or more of pores with a 1 μm pore diameter or more, carry the potassium iodide in an amount of 5 to 70% of a total adsorbent weight, so as to set a volume of pores with a 1 μm pore diameter or more in the mercury-removal adsorbent to 0.6 mL/g or more.

A method of the present invention of adsorptively removing mercury from liquid or gas containing the mercury includes a mercury removal step of adsorptively removing the mercury from the gas or the liquid by using the above-described mercury-removal adsorbents. Here, examples of the liquid or gas containing mercury are hydrocarbon of crude oil and condensate and of fractions and so on such as LPG and naphtha produced in processes of distillation and stripping of crude oil and condensate, and exhaust combustion gas, and so on.

Here, in a case where the liquid is hydrocarbon, preferably, the method further includes a dehydration step of removing water contained in the hydrocarbon from the hydrocarbon, and in the mercury removal step, the mercury is adsorptively removed from the hydrocarbon from which free water is removed in the dehydration step. It is especially preferable that the dehydration step removes the water in the hydrocarbon to lower water concentration nearly to saturation solubility at an operating temperature of the mercury removal step which is a post process. The method may further include an effluence removal step of removing an effluence which originates from the potassium iodide carried by the activated carbon support and flows into the hydrocarbon from the mercury-removal adsorbent in the mercury removal step, and in this case, it is preferable that the hydrocarbon from which the mercury is adsorptively removed in the mercury removal step is subjected to the effluence removal step until a predetermined timing after the use of the mercury-removal adsorbent is started, and the effluence removal step is stopped after the predetermined timing.

According to the present invention, the mercury-removal adsorbents, even if carrying a large amount of potassium iodide in an amount of 5 to 70% of the total adsorbent weight, can fully exhibit mercury removal performance since a volume of the pores with a 1 μm pore diameter or more in the mercury-removal adsorbent is sufficiently large, that is, a 0.6 mLg or more and thus the micropores are not filled/closed with the carried potassium iodide. As a result, since an amount of mercury adsorptively removable per unit weight of the adsorbent can be greatly increased, it is possible to adsorptively remove ionic mercury and organic mercury, which have conventionally been difficult to adsorptively remove, to lower their concentration to a small value.

Figure 1:
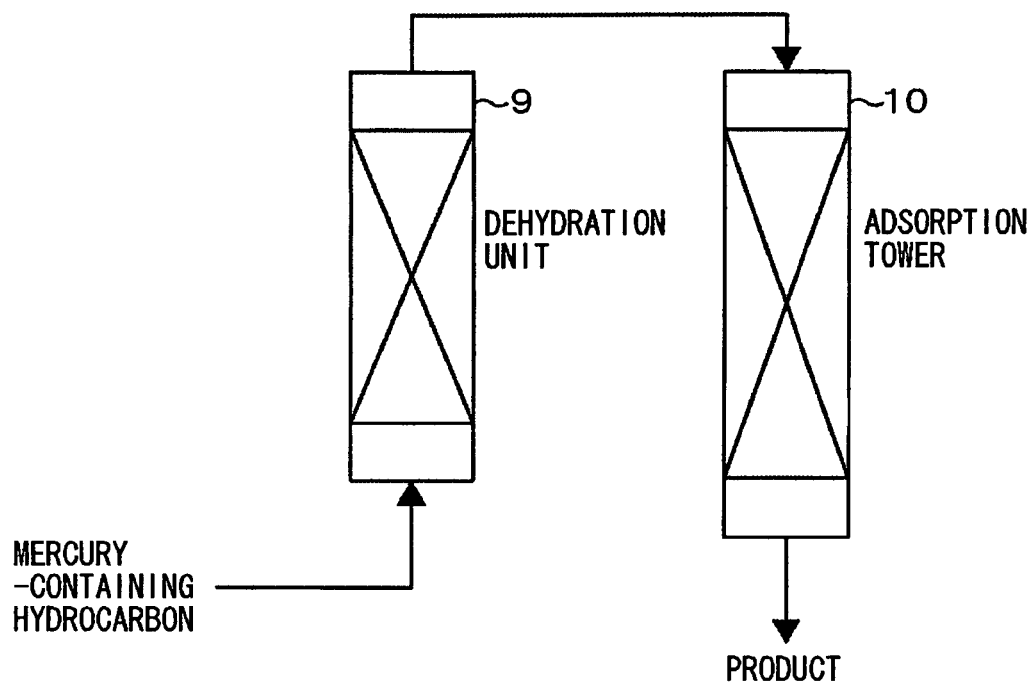
FIG. 1 is a schematic view showing a basic flow of a method of adsorptively removing mercury contained in liquid hydrocarbon, by using mercury-removal adsorbents according to an embodiment.
Figure 2:
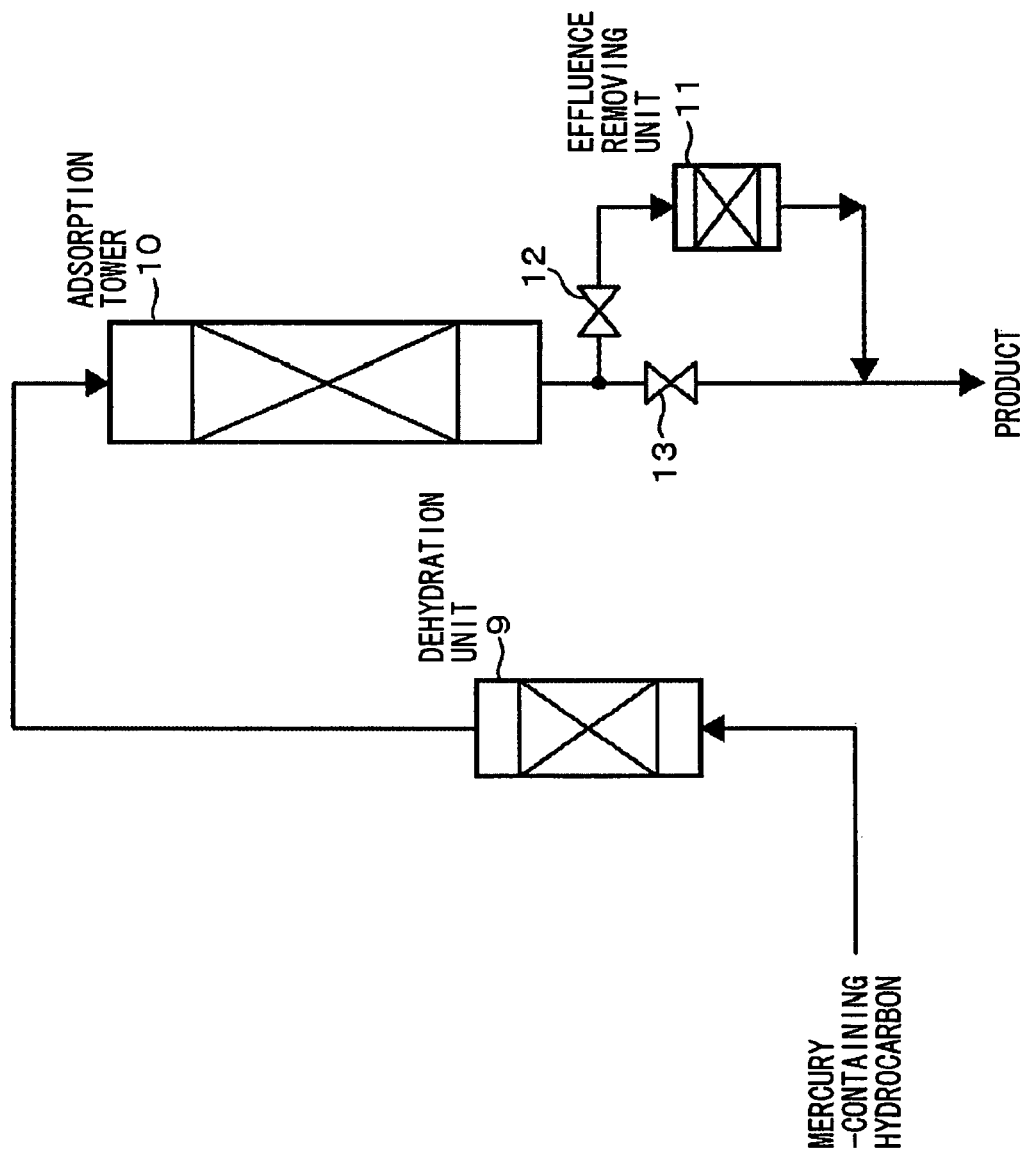
FIG. 2 is a schematic view showing a flow including an effluence removing unit for removing potassium iodide flowing out into the liquid hydrocarbon.

| Explanation of Codes | |
|---|---|
| 9 | dehydration unit |
| 10 | adsorption tower |
| 11 | effluence removing unit |
| 12, 13 | switching valve |

BEST MODE FOR CARRYING OUT THE INVENTION

The mercury-removal adsorbents of the present invention can be produced as follows, for instance, but the present invention is not limited to the method disclosed below. An example of a raw material of an activated carbon support suitable for this embodiment is a raw material containing a large amount of cellulose such as, for example, a wooden material and a coconut shell. In a zinc chloride activation method, for example, by appropriately changing the concentration of zinc chloride, activation operating temperature, and activation time, it is possible to prepare, from these raw materials, activated carbon having a pore volume structure in which volume of pores with a 1 μm pore diameter or more is 1.0 mL/g or more.

Then, this activated carbon support is immersed in a water solution containing potassium iodide whose concentration is, for example, 15 to 30 wt %, at room temperature for several hours, to be impregnated with the water solution, and is dried at 120 to 150° C. for several hours after going through drainage, whereby it is possible to obtain mercury-removal adsorbents carrying potassium iodide in an amount of 5 to 70% of the total weight.

As described above, as mercury contained in hydrocarbon liquids such as crude oil and condensate, ionic mercury and organic mercury which are relatively difficult to adsorb by a conventional mercury-removal adsorbents are contained, besides elemental mercury. As for such ionic mercury, halogen compounds work as effective supports for adsorptively remove ionic mercury from the hydrocarbon liquid owing to halogen's strong chemical bonding strength with mercury. Among halogen compounds, potassium iodide is especially excellent for practical use not only in view of high reactivity of iodine and mercury but also in view of material corrosion, poisoning property, water solubility, cost, and so on, that is, in view of the fact that potassium iodide satisfies various conditions necessary for practical application of adsorptive removal of mercury from hydrocarbon liquids.

Further, as for the correlation between an amount of potassium iodide carried and mercury adsorptive removal performance, an amount of adsorbable mercury increases in accordance with an increase in an amount of potassium iodide carried, but in accordance with the increase in the carried amount, micropores and mesopores in the activated carbon support are closed to reduce surface area of the pores, which poses a problem of greatly lowering a reaction rate of mercury and the mercury-removal adsorbents. In this respect, if a volume of pores with a 1 μm pore diameter or more in the mercury-removal adsorbents is 0.6 mL/g or more, unclosed pores are left, so that the mercury-removal adsorbents can exhibit excellent performance, without any great decrease in a mercury chemical adsorption rate which would be caused if the pores were closed.

As described above, potassium iodide reacts with mercury due to their strong chemical bonding action, whereby mercury iodide is produced. A preferable activated carbon support has a sufficient pore surface area and a sufficient volume of a carried substance which are large enough for mercury to come into contact with and react with potassium iodide. It is thought that these actions work together, so that the mercury-removal adsorbents according to this embodiment exhibits favorable performance also for adsorptively removing, from hydrocarbon, ionic mercury which has been difficult to remove by a conventional mercury-removal adsorbents. Further, even if mercury contained in hydrocarbon takes a form of organic mercury, it is thought that the organic mercury can be adsorptively removed by the same actions as the actions working for ionic mercury. It goes without saying that a catalytic action of activated carbon used as a support is an important factor for efficient adsorption of ionic mercury and organic mercury.

Here, if an amount of potassium iodide carried is less than 27% of the total adsorbent weight, the life of the mercury-removal adsorbents becomes short, and thus an adsorption tower filled with the mercury-removal adsorbents has to be made larger or the mercury-removal adsorbents have to be changed more frequently, often resulting in lack of practicability. Further, if the amount of potassium iodide carried exceeds 70%, it is thought that the mercury removal performance cannot be fully exhibited because most parts of the pores are closed even if the volume of the pores with a 1 μm pore diameter or more is 0.6 mL/g or more, resulting in a great decrease in the pore surface area.

FIG. 1 schematically shows a basic flow of a method of removing mercury by adsorption contained in liquid hydrocarbon, by using the mercury-removal adsorbents according to this embodiment. In this flow, a dehydration unit 9 removing free water contained in a processed liquid and an adsorption tower 10 are included. The dehydration unit 9 is, for example, a coalescer or the like, and has a function of removing water in the liquid hydrocarbon to lower the water concentration nearly to saturated solubility at an operating temperature of the subsequent-stage adsorption tower 10 (dehydration step). Since potassium iodide is water soluble, by removing free water contained in the liquid hydrocarbon in the pre-process, it is possible to prevent potassium iodide carried by the mercury-removal adsorbents from flowing out into the processed liquids.

The adsorption tower 10 is structured as, for example, a packed tower filled with the mercury-removal adsorbents according to this embodiment, and has a function of adsorptively removing mercury contained in the liquid hydrocarbon (mercury removal step). In this flow, the liquid hydrocarbon containing mercury is fed to the dehydration unit 9, where free water is removed from the liquid hydrocarbon, and thereafter, the liquid hydrocarbon is fed to the adsorption tower 10. Then, mercury is removed by adsorption therefrom by the mercury-removal adsorbents filled in the adsorption tower 10, so that it is possible to obtain the liquid hydrocarbon (product) whose mercury concentration is lowered to the specification value.

Incidentally, in a case where the fed liquid hydrocarbon does not contain water (free water) whose concentration is equal to or more than the saturated water concentration at the operating temperature of the adsorption tower, the dehydration unit 9 need not be installed. Further, in a case where the processed fluid is gaseous hydrocarbon or exhaust combustion gas, the installation of the dehydration unit 9 is not usually necessary. The adsorption tower 10 is generally of a fixed bed (floor) type, but may be of a fluidized bed (floor) type or a movable bed (floor) type, if necessary.

Further, there is a risk that, out of potassium iodide on the activated carbon support, a small amount of substance not bonded with the carbon support and substance having a week bonding strength with the carbon support may flow in a state of potassium iodide or in a state of free iodine or an iodine compound, into the liquid hydrocarbon, for example, immediately after the start of the operation of the absorption tower 10, to adversely affect a downstream process, such as becoming a catalytic poison in a desulfurization process. A possible structure to solve the problem is to branch a product pipe on a downstream side of the absorption tower 10 in the aforesaid basic flow, and provide an effluence removing unit 11 in one of the branched pipes, thereby obtaining the liquid hydrocarbon as a product after the effluence originating from these potassium iodides are removed in this removing unit 11 (an effluence removal step). The effluence removing unit 11 is filled with, for example, activated carbon, and the effluence flowing out into the liquid hydrocarbon is adsorptively removed by this activated carbon. In this case, the product pipe in which the effluence removing unit 11 is provided and a pipe without the removing unit 11 have switching valves 12, 13 for switching these pipes, and the product is obtained in such a manner that the liquid hydrocarbon is passed into the effluence removing unit 11, for example, during a period immediately after the start of the operation, and at a predetermined timing thereafter (for example, at a timing when a considerable time has passed from the start of the operation and the outflow of the effluence into the liquid hydrocarbon no longer takes place), the product pipe for use is changed so that the liquid hydrocarbon bypasses the effluence removing unit 11.

EXAMPLES (Tests of Adsorptively Removing Mercury Contained in Liquid Hydrocarbon)

A. Preconditions of the Tests n-hexane was used as liquid hydrocarbon. Tests of adsorptively removing mercuries in various forms were conducted by dissolving organic mercury (diethyl mercury), ionic mercury (mercapto mercury), and elemental mercury in the liquid hydrocarbons.

Batch adsorption tests were conducted in which mercury-containing liquid hydrocarbons were brought into contact with various kinds of mercury-removal adsorbents in a reactor. Table 1 shows test conditions.

TABLE 1

| Test Conditions | |
|---|---|
| test method | batch test |
| temperature (° C.) | 23-26 |
| pressure (MPaG) | 0.1 |
| fed liquid amount (mL) | 300 |
| amount of adsorbent (mL) | 20 |
| particle size of adsorbent (mm) | 0.5-1.8 |
| test time (hr) | 40 |

Here, pore volumes of each activated carbon support and each mercury-removal adsorbent were measured by a mercury porosimeter method and surface areas were measured by a BET method. Further, an amount of potassium iodide carried by the activated carbon support was quantified by measuring differences in weights of the activated carbon support and the mercury-removal adsorbents before and after the activated carbon support carried potassium iodide, or by measuring an amount of potassium iodide left in a potassium iodide solution after the activated carbon support carried potassium iodide. An amount of mercury was measured with a mercury analyzer (SP-3) manufactured by Nippon Instruments Corp.

Performance of each mercury-removal adsorbent was evaluated according to the time required for the mercury concentration to reach 1 wtppb or lower (specification value), based on long years of experience regarding the correlation between batch adsorption and column adsorption. A mercury-removal adsorbent capable of lowering the mercury concentration to the specification value within eight hours was evaluated as "excellent", a mercury-removal adsorbent requiring eight hours to 24 hours to lower the mercury concentration to the specification value was evaluated as "good", and a mercury-removal adsorbents unable to lower the mercury concentration to the specification value within 24 hours was evaluated as "poor".

B. Examples and Comparative Examples

Example 1

Table 2 and Table 3 show properties of liquid hydrocarbon and a mercury-removal adsorbent, respectively, used in the test. In the example 1, the mercury-removal adsorbent satisfying the following requirements are used: (Requirement 1) "a volume of pores with a 1 μm pore diameter or more is 0.6 mL/g or more"; and (Requirement 2) "an amount of potassium iodide carried is 5 to 70% of the total adsorbent weight". Table 4 shows the test result.

As is seen from Table 4, this mercury-removal adsorbents was able to remove even organic mercury, which is thought to be difficult to remove by a conventional mercury-removal adsorbents, to lower the mercury concentration to the specification value within eight hours, and was evaluated as "excellent".

TABLE 2

Properties of Liquid Hydrocarbon of Example 1

| | |
|---|---|
| hydrocarbon | n-hexane |
| mercury form | organic mercury (diethyl mercury) |
| mercury concentration | 51 wtppb |

TABLE 3

Properties of Mercury-Removal Adsorbent of Example 1

| | |
|---|---|
| support type | wooden activated carbon A |
| activation method | zinc chloride |
| support size | 0.5 mm-1.8 mm |
| pore volume of support (Total) | 2.3 mL/g |
| pore volume of support (1 μm pore diameter or more) | 1.2 mL/g |
| pore surface area of Support (before carriage) | 1,480 m$^2$/g |
| carried substance | potassium iodide (KI) (industrial chemicals, purity >99.5%) |
| amount of potassium iodide (KI) carried | 33 wt % |
| content of zinc chloride (ZnCl$_2$) | 200 ppm |
| pore surface area of adsorbent (after carriage) | 750 m$^2$/g |
| pore volume of adsorbent (1 μm pore diameter or more) | 0.9 mL/g |

| accumulated pore volume distribution (before carriage) | |
|---|---|
| pore diameter (μm) | pore volume (mL/g) |
| >140.0 | 0.005 |
| >70.0 | 0.238 |

TABLE 3-continued

Properties of Mercury-Removal Adsorbent of Example 1

| | |
|---|---|
| >30.0 | 0.486 |
| >20.0 | 0.601 |
| >15.0 | 0.678 |
| >9.0 | 0.811 |
| >6.0 | 0.851 |
| >2.5 | 1.033 |
| >2.0 | 1.089 |
| >1.0 | 1.213 |
| >0.5 | 1.276 |
| >0.1 | 1.393 |
| >0.05 | 1.514 |
| >0.03 | 1.663 |
| >0.01 | 2.062 |
| >0.005 | 2.259 |
| >0.0037 | 2.320 |

TABLE 4

Test Result of Example 1

| elapsed time (hr) | concentration of organic mercury (wtppb) |
|---|---|
| 0.0 | 51.0 |
| 1.5 | 29.0 |
| 4.5 | 5.6 |
| 8.0 | 0.8 |

Example 2

A mercury-removal adsorbent satisfying (Requirement 1) and (Requirement 2) was prepared by using an activated carbon support manufactured by a different maker from that in the example 1, and the test was conducted on this mercury-removal adsorbent. The test was conducted under the same conditions as those of the example 1. Table 5 shows properties of the mercury-removal adsorbent used in the example 2 and Table 6 shows the test result.

As a result of the test, this mercury-removal adsorbent was able to remove organic mercury to lower the mercury concentration to the specification value within 24 hours, and was evaluated as "good".

TABLE 5

Properties of Mercury-Removal Adsorbent of Example 2

| | |
|---|---|
| support type | wooden activated carbon B |
| activation method | zinc chloride |
| pore volume of support (Total) | 2.9 mL/g |
| pore volume of adsorbent (1 μm pore diameter or more) | 0.9 mL/g |
| pore volume of support (1 μm pore diameter or more) | 1.7 mL/g |
| pore surface area of support (before carriage) | 1,531 m$^2$/g |
| amount of potassium iodide (KI) carried | 34 wt % |
| content of zinc chloride (ZnCl$_2$) | 200 ppm |

TABLE 6

Test Result of Example 2

| elapsed time (hr) | concentration of organic mercury (wtppb) |
|---|---|
| 0.0 | 51.0 |
| 1.5 | 29.6 |
| 4.5 | 10.2 |
| 8.0 | 2.0 |
| 24.0 | <0.1 |

Example 3

The example 3 is different from the example 1 in that a mercury-removal adsorbent used in the example 3 included an activated carbon support prepared by steam activation. This mercury-removal adsorbent satisfied (Requirement 1) and (Requirement 2) and the test was conducted under the same conditions as those of the example 1. Table 7 shows properties of the mercury-removal adsorbent used in the example 3 and Table 8 shows the test result.

As a result of the test, this mercury-removal adsorbent was able to lower the concentration of organic mercury to the specification value within eight hours, and was evaluated as "excellent".

TABLE 7

Properties of Mercury-Removal Adsorbent of Example 3

| support type | wooden activated carbon C |
|---|---|
| activation method | steam |
| pore volume of support (Total) | 4.3 mL/g |
| pore volume of adsorbent (1 μm pore diameter or more) | 0.9 mL/g |
| pore volume of support (1 μm pore diameter or more) | 3.9 mL/g |
| pore surface area of support (before carriage) | 972 m$^2$/g |
| amount of potassium iodide (KI) carried | 34 wt % |
| content of zinc chloride (ZnCl$_2$) | 0 ppm |

TABLE 8

Test Result of Example 3

| elapsed time (hr) | concentration of organic mercury (wtppb) |
|---|---|
| 0.0 | 51.0 |
| 1.5 | 28.6 |
| 4.5 | 9.7 |
| 8.0 | 1.0 |

Example 4

The example 4 is different from the example 1 in that a mercury-removal adsorbent used in the example 4 included an activated carbon support prepared by zinc chloride activation of a coconut-shell raw material. This mercury-removal adsorbent satisfied (Requirement 1) and (Requirement 2). The concentration of organic mercury in liquid hydrocarbon was set to 45.4 wtppb. Table 9 shows properties of the mercury-removal adsorbent used in the example 4 and Table 10 shows the test result.

Example 1-4

For comparison with the test result of the example 4, a test was conducted on liquid hydrocarbon containing organic mercury whose concentration was equal to that in the example 4, by using the mercury-removal adsorbent used in the example 1. Table 10 shows the test result.

In the example 4, the mercury-removal adsorbents was able to remove organic mercury to lower the mercury concentration nearly to the specification value in no longer than five hours and was evaluated as "excellent". Compared with the example 1-4, the mercury-removal adsorbent of the example 4 removed mercury at a higher rate than the mercury-removal adsorbent using wooden activated carbon, but its mechanical fragility such as pulverization was observed during the test.

TABLE 9

Properties of Mercury-Removal Adsorbent of Example 4

| support type | coconut-shell activated carbon |
|---|---|
| activation method | zinc chloride |
| pore volume of adsorbent (1 μm pore diameter or more) | 0.9 mL/g |
| pore volume of support (1 μm pore diameter or more) | 1.2 mL/g |
| pore surface area of support (before carriage) | 680 m$^2$/g |
| amount of potassium iodide (KI) carried | 34 wt % |
| content of zinc chloride (ZnCl$_2$) | 210 ppm |

TABLE 10

Test Results of Example 4 and Example 1-4

| elapsed time (hr) | example 4 (coconut-shell activated carbon) concentration of organic mercury (wtppb) | example 1-4 (wooden activated carbon) concentration of organic mercury (wtppb) |
|---|---|---|
| 0.0 | 45.4 | 45.4 |
| 2.0 | 22.1 | 27.4 |
| 5.0 | 1.4 | 2.9 |

Example 5

The example 5 is different from the example 4 in that mercury in liquid hydrocarbon was ionic mercury (mercapto mercury). The concentration of ionic mercury was set to 56.2 wtppb. Table 11 shows the test result.

In the example 5, a mercury-removal adsorbent was able to remove ionic mercury to lower the concentration of ionic mercury to the specification value in no longer than five hours, and was evaluated as "excellent". Further, as is understood from the comparison with the example 4 in which organic mercury was adsorptively removed by using the same coconut-shell activated carbon support (the concentration was converted so that mercury concentration at the test start time becomes the same value as that of the example 5), ionic mercury is more easily adsorbed than organic mercury.

Compared with the following example 6 (the concentration was converted in the same manner) in which ionic mercury was adsorptively removed by the wooden activated carbon support used in the example 1, in adsorptive removal of ionic mercury, the mercury-removal adsorbent of the example 5 removed mercury at a higher rate than the mercury-removal adsorbent using the wooden activated carbon support.

TABLE 11

Test Result of Example 5 and Comparison with Example 4 and Example 6

| elapsed time (hr) | example 5 (coconut-shell activated carbon) concentration of ionic mercury (wtppb) | example 4 (coconut-shell activated carbon) concentration of organic mercury (wtppb) | example 6 (wooden activated carbon) concentration of ionic mercury (wtppb) |
|---|---|---|---|
| 0.0 | 56.2 | 56.2 | 56.2 |
| 2.0 | 7.2 | 27.4 | 9.9 |
| 4.5 | — | — | 1.6 |
| 5.0 | 0.2 | 1.7 | — |
| 8.0 | — | — | 0.4 |

Example 6

The example 6 is different from the example 1 in that mercury in liquid hydrocarbon was ionic mercury (mercapto mercury). The concentration of ionic mercury was set to 51.0 wtppb. Table 12 shows the test result.

As is seen from Table 12, this mercury-removal adsorbents was able to remove ionic mercury to lower the mercury concentration to the specification value within eight hours, and was evaluated as "excellent". Comparison with the test result of the example 1 (see Table 4) shows that ionic mercury can be more easily adsorbed than organic mercury if the same mercury-removal adsorbent is used.

TABLE 12

Test Result of Example 6

| elapsed time (hr) | concentration of ionic mercury (wtppb) |
|---|---|
| 0.0 | 51.0 |
| 2.0 | 9.0 |
| 4.5 | 1.5 |
| 8.0 | 0.4 |

Example 7

The example 7 is different from the example 1 in that mercury in liquid hydrocarbon was elemental mercury. The concentration of elemental mercury was set to 52.0 wtppb. Table 13 shows the test result.

As is seen from Table 13, this mercury-removal adsorbent was able to remove elemental mercury to lower the mercury concentration to the specification value in 4.5 hours, and was evaluated as "excellent". Comparison with the test result of the example 1 (see Table 4) shows that elemental mercury can be more easily adsorbed than organic mercury if the same mercury-removal adsorbent is used.

TABLE 13

Test Result of Example 7

| elapsed time (hr) | concentration of elemental mercury (wtppb) |
|---|---|
| 0.0 | 52.0 |
| 2.0 | 8.0 |
| 4.5 | 1.0 |
| 8.0 | <0.2 |

Example 8

The example 8 is different from the example 1 in that an amount of potassium iodide carried was set to 45% of the total adsorbent weight within a range satisfying (Requirement 2). Table 14 shows the test result.

As is seen from the test result, this mercury-removal adsorbent was able to lower the concentration of organic mercury to half the specification value in eight hours after the start of the test, and was evaluated as "excellent". Compared with the example 1, no great difference was observed in mercury adsorption rate, but pulverization of the mercury-removal adsorbent was observed when the mercury-removal adsorbent came into contact with liquid hydrocarbon.

Example 9

The example 9 is different from the example 1 in that an amount of potassium iodide carried was set to 52% of the total adsorbent weight within a range satisfying (Requirement 2). Table 14 shows the test result.

As is seen from the test result, this mercury-removal adsorbent was able to lower the concentration of organic mercury to the specification value or lower in eight hours after the start of the test, and was evaluated as "excellent". Compared with the example 1, no great difference was observed in mercury adsorption rate, but pulverization of the mercury-removal adsorbent was more prominent than was observed in the example 8.

Example 10

The example 10 is different from the example 1 in that an amount of potassium iodide carried was set to 60% of the total adsorbent weight within a range satisfying (Requirement 2). Table 14 shows the test result.

As is seen from the test result, this mercury-removal adsorbent was able to lower the concentration of organic mercury to the specification value in ten hours after the start of the test, and was evaluated as "good". Compared with the example 1, a slight decrease in mercury adsorption rate was observed. Pulverization of the mercury-removal adsorbent was more prominent than was observed in the example 9.

Example 11

The example 11 is different from the example 1 in that an amount of potassium iodide carried was set to 70% of the total adsorbent weight within a range satisfying (Requirement 2). Table 14 shows the test result.

As is seen from the test result, this mercury-removal adsorbent was able to lower the concentration of organic mercury to the specification value in twenty hours after the start of the test, and was evaluated as "good". Compared with the example 1, a decrease in mercury adsorption rate was observed. Pulverization of the mercury-removal adsorbent was more prominent than was observed in the example 10.

Comparative Example 12

The comparative example 12 is different from the example 1 in that an amount of potassium iodide carried was set to 80% of the total adsorbent weight, and (Requirement 2) was not satisfied. Table 14 shows the test result.

As is seen from the test result, this mercury-removal adsorbent was unable to lower the concentration of organic mercury to the specification value or lower even when twenty hours passed from the start of the test, and was evaluated as "poor". Compared with the example 1, a great decrease in mercury adsorption rate was observed, and pulverization of the mercury-removal adsorbent was also prominent.

TABLE 14

Test Results of Example 8 to Comparative Example 12

| | concentration of organic mercury (wtppb) | | | | |
|---|---|---|---|---|---|
| elapsed time (hr) | example 8 | example 9 | example 10 | example 11 | comparative example 12 |
| 0.0 | 52.0 | 52.0 | 52.0 | 52.0 | 52.0 |
| 2.0 | 30.0 | 32.0 | 35.0 | 37.0 | 40.0 |
| 4.5 | 6.1 | 7.0 | 11.0 | 16.0 | 25.0 |
| 8.0 | <0.4 | <1.0 | 3.0 | 5.0 | 12.0 |
| 10.0 | — | — | 1.0 | — | — |
| 20.0 | — | — | — | 1.0 | 5.0 |

Example 13

A test was conducted in the following manner: the mercury-removal adsorbent of the example 1 was filled in a column (inside diameter 22 mm, bed length 1,200 mm), and heavy naphtha containing both ionic mercury and elemental mercury with the total mercury concentration varying within a range from 30 to 650 wtppb was passed therethrough at a superficial velocity of 0.4 cm/sec.

During an about six-month period, the total mercury concentration in the heavy naphtha flowing out of the column was less than 1 wtppb, and thus a favorable test result was obtained.

Example 14

The example 14 is different from the example 1 in that an amount of potassium iodide carried was set to 25% of the total adsorbent weight within a range satisfying (Requirement 2). Table 15 shows the test result.

As is seen from the test result, this mercury-removal adsorbent was able to lower the concentration of organic mercury to less than the specification value in 16 hours after the start of the test, and was evaluated as "good". Compared with the example 1, a decrease in mercury adsorption rate was observed.

Example 15

The example 15 is different from the example 1 in that an amount of potassium iodide carried was set to 15% of the total adsorbent weight within a range satisfying (Requirement 2). Table 15 shows the test result.

As is seen from the test result, this mercury-removal adsorbent was able to lower the concentration of organic mercury to less than the specification value in 16 hours after the start of the test, and was evaluated as "good". Compared with the example 14, a decrease in mercury adsorption rate was observed.

Example 16

The example 16 is different from the example 1 in that an amount of potassium iodide carried was set to 5.5% of the total adsorbent weight within a range satisfying (Requirement 2). Table 15 shows the test result.

As is seen from the test result, this mercury-removal adsorbent was able to lower the concentration of organic mercury to less than the specification value in 16 hours after the start of the test, and was evaluated as "good". Compared with the example 15, a decrease in mercury adsorption rate was observed.

TABLE 15

| elapsed time (hr) | concentration of organic mercury (wtppb) | | |
|---|---|---|---|
| | example 14 | example 15 | example 16 |
| 0.0 | 51.0 | 51.0 | 51.0 |
| 1.5 | 32.0 | 35.0 | 37.0 |
| 4.5 | 7.5 | 8.9 | 9.8 |
| 8.0 | 2.5 | 3.8 | 4.3 |
| 16.0 | <1.0 | <1.0 | <1.0 |

Comparative Example 1

The comparative example 1 is different from the example 1 in that a coal-based activated carbon support not satisfying (Requirement 1) was used. Further, the concentration of organic mercury in liquid hydrocarbon was set to 52.4 wtppb. Table 16 shows properties of mercury-removal adsorbent used in the comparative example 1, and Table 17 shows the test result.

As is seen from Table 17, the mercury-removal adsorbent used in the comparative example 1 was unable to lower the concentration of organic mercury to the specification value within 24 hours, and was evaluated as "poor". Possible reasons for this may be that pores are closed by carried potassium iodide since the activated carbon support used had a small volume of pores with a 1 μm pore diameter or more, and that activated carbon of the coal-based raw material does not exhibit an effective catalytic action.

TABLE 16

Properties of Mercury-Removal Adsorbent of Comparative Example 1

| | |
|---|---|
| support type | coal-based activated carbon A |
| activation method | steam |
| pore volume of support (Total) | 0.5 mL/g |
| pore volume of adsorbent (1 μm pore diameter or more) | 0.1 mL/g |
| pore volume of support (1 μm pore diameter or more) | 0.1 mL/g |
| pore surface area of support (before carriage) | 680 m$^2$/g |
| amount of potassium iodide (KI) carried | 34 wt % |
| content of zinc chloride (ZnCl$_2$) | 0 ppm |

TABLE 17

Test Result of Comparative Example 1

| elapsed time (hr) | concentration of organic mercury (wtppb) |
|---|---|
| 0.0 | 52.4 |
| 1.5 | 35.7 |
| 4.5 | 19.0 |
| 8.0 | 8.6 |
| 24.0 | 4.0 |

Comparative Example 2

The comparative example 2 is different from the example 1 in that a coal-based activated carbon support used here was of a different type from that of the comparative example 1 and did not satisfy (Requirement 1). The following is a reason why the test was further conducted on the coal-based activated carbon support of a different type. That is, coal-based activated carbon is most often used among activated carbons, and therefore, the inventors thought that some support material among coal-based activated carbons might exhibit high mercury adsorption performance. The concentration of organic mercury in liquid hydrocarbon was set equal to that of the comparative example 1. Table 18 shows properties of mercury-removal adsorbent used in the comparative example 2, and Table 19 shows the test result.

As is seen from Table 19, the mercury-removal adsorbent used in the comparative example 2 was unable to lower the concentration of organic mercury to the specification value within 24 hours, and was evaluated as "poor". Incidentally, a test was conducted in which a still another type of coal-based activated carbon was used as a support, and the result of this test was similar to the test results of the comparative examples 1, 2, though omitted in order to avoid complication. It is thought that the coal-based activated carbon is not suitable as a support for the same reason as is described in the comparative example 1.

TABLE 18

Properties of Mercury-Removal Adsorbent of Comparative Example 2

| | |
|---|---|
| support type | coal-based activated carbon B |
| activation method | steam |
| pore volume of support (Total) | 0.7 mL/g |
| pore volume of adsorbent (1 μm pore diameter or more) | 0.2 mL/g |
| pore volume of support (1 μm pore diameter or more) | 0.2 mL/g |
| pore surface area of support (before carriage) | 1.512 m$^2$/g |
| amount of potassium iodide (KI) carried | 30 wt % |
| content of zinc chloride (ZnCl$_2$) | 0 ppm |

TABLE 19

Test Result of Comparative Example 2

| elapsed time (hr) | concentration of organic mercury (wtppb) |
|---|---|
| 0.0 | 52.4 |
| 1.5 | 40.0 |
| 4.5 | 27.0 |
| 8.0 | 17.0 |
| 24.0 | 12.0 |

Comparative Example 3

The comparative example 3 is different from the example 1 in that a steam-activated, coconut shell-based activated carbon support not satisfying (Requirement 1) was used. The concentration of organic mercury in liquid hydrocarbon was set equal to that in the comparative example 1. Table 20 shows properties of mercury-removal adsorbent used in the comparative example 3, and Table 21 shows the test result.

As is seen from Table 21, the mercury-removal adsorbent used in the comparative example 3 was not able to lower the concentration of organic mercury to the specification value within 24 hours, and was evaluated as "poor". The example 1 and the example 3 both using wooden activated carbon activated by different methods were both evaluated as "excellent", but the example 4 and the comparative example 3 both using coconut shell-based activated carbon activated by different methods were differently evaluated, the former evaluated as "excellent" and the latter evaluated as "poor". These results show that performance of mercury-removal adsorbent does not depend on the activation method of an activated carbon support but is greatly influenced by whether or not (Requirement 1) is satisfied.

TABLE 20

Properties of Mercury-Removal Adsorbent of Comparative Example 3

| | |
|---|---|
| support type | coconut shell-based activated carbon A |
| activation method | steam |
| support size | 0.1-0.5 mm |
| pore volume of support (Total) | 0.4 mL/g |
| pore volume of adsorbent (1 μm pore diameter or more) | 0.1 mL/g |
| pore volume of support (1 μm pore diameter or more) | 0.1 mL/g |
| pore surface area of support (before carriage) | 902 m$^2$/g |
| amount of potassium iodide (KI) carried | 34 wt % |
| content of zinc chloride (ZnCl$_2$) | 0 ppm |

TABLE 21

Test Result of Comparative Example 3

| elapsed hour (hr) | concentration of organic mercury (wtppb) |
|---|---|
| 0.0 | 52.4 |
| 1.5 | 38.0 |
| 4.5 | 25.0 |
| 8.0 | 16.0 |
| 24.0 | 10.0 |

Comparative Example 4

In the comparative example 4, a coconut shell-based activated carbon support of a different type (steam-activated) from that of the comparative example 3 was used. In this case, only (Requirement 1) is not satisfied. Table 22 shows properties of mercury-removal adsorbent of the comparative example 4, and Table 23 shows the test result.

As is seen from Table 23, the mercury-removal adsorbent used in the comparative example 4 was unable to lower the concentration of organic mercury to the specification value within 24 hours, and was evaluated as "poor".

TABLE 22

Properties of Mercury-Removal Adsorbent of Comparative Example 4

| | |
|---|---|
| support type | coconut-shell activated carbon B |
| activation method | steam |
| pore volume of support (Total) | 1.9 mL/g |
| pore volume of adsorbent (1 μm pore diameter or more) | 0.2 mL/g |
| pore volume of support (1 μm pore diameter or more) | 0.4 mL/g |
| pore surface area of support (before carriage) | 680 m$^2$/g |
| amount of potassium iodide (KI) carried | 34 wt % |
| content of zinc chloride (ZnCl$_2$) | 0 ppm |

TABLE 23

Test Result of Comparative Example 4

| elapsed time (hr) | concentration of organic mercury (wtppb) |
|---|---|
| 0.0 | 52.4 |
| 1.5 | 35.7 |
| 4.5 | 19.0 |
| 8.0 | 8.6 |
| 24.0 | 4.0 |

Comparative Example 5

The comparative example 5 is different from the example 1 in that an activated carbon support carried sodium iodide instead of potassium iodide and only (Requirement 2) was not satisfied. Further, the concentration of organic mercury in liquid hydrocarbon was set to 52.0 wtppb. Table 24 shows properties of mercury-removal adsorbent used in the comparative example 5, and Table 25 shows the test result.

As is seen from Table 25, the mercury-removal adsorbent used in the comparative example 5 was unable to lower the concentration of organic mercury to the specification value within 24 hours, and was evaluated as "poor". Since this mercury-removal adsorbents was evaluated as "poor" even though using the activated carbon support satisfying (Requirement 1), it can be said that carrying potassium iodide having a strong chemical bonding strength with mercury (Requirement 2) plays an important role in producing an "excellent" mercury-removal adsorbent. Incidentally, sodium iodide is thought to be disadvantageous compared with potassium iodide because, due to high water solubility of sodium iodide, sodium iodide dissolves in and flows into a small amount of water.

TABLE 24

Properties of Mercury-Removal Adsorbent of Comparative example 5

| support type | wooden activated carbon |
|---|---|
| pore surface area of Support (before carriage) | 1,430 m$^2$/g |
| amount of sodium iodide (NaI) carried | 33 wt % |
| pore surface area of support (after carriage) | 755 m$^2$/g |

TABLE 25

Test Result of Comparative Example 5

| elapsed time (hr) | concentration of organic mercury (wtppb) |
|---|---|
| 0.0 | 52.0 |
| 1.5 | 38.0 |
| 4.5 | 22.0 |
| 8.0 | 10.0 |
| 24.0 | 5.0 |

Comparative Example 6

The comparative example 6 is different from the example 1 in that an alumina support instead of the activated carbon support carried potassium iodide. The concentration of organic mercury in liquid hydrocarbon was set equal to that in the comparative example 1. Table 26 shows properties of mercury-removal adsorbent of the comparative example 6, and Table 27 shows the test result.

As is seen from Table 27, the mercury-removal adsorbent used in the comparative example 6 was unable to lower the concentration of organic mercury to the specification value within 24 hours, and was evaluated as "poor". As shown in Table 26, a volume of pores with a 1 μm pore diameter or more is 0.1 mL/g, which is only about 10% of that in the example 1. As a result, an amount of potassium iodide that can be carried is only 8 wt % of the total adsorbent weight and the pores of the support are considerably closed, which are thought to be reasons for far poorer mercury removal performance. Further, compared with the alumna support, the activated carbon support is thought to have a more advantageous catalytic action for the adsorption of a mercury compound.

TABLE 26

Properties of Mercury-Removal Adsorbent of Comparative Example 6

| Support type | alumina |
|---|---|
| support size | trilobe form ½ inch |
| carried substance | potassium iodide |
| pore surface area of support (before carriage) | 226 m$^2$/g |
| amount of potassium iodide (KI) carried | 8 wt % |
| pore surface area of adsorbent (after carriage) | 170 m$^2$/g |
| pore volume of support (Total) | 0.5 mL/g |
| pore volume of adsorbent (1 μm pore diameter or more) | 0.1 mL/g |
| pore volume of support (1 μm pore diameter or more) | 0.2 mL/g |

TABLE 27

Test Result of Comparative Example 6

| elapsed time (hr) | concentration of organic mercury (wtppb) |
|---|---|
| 0.0 | 52.4 |
| 1.5 | 37.0 |
| 4.5 | 25.0 |
| 8.0 | 21.0 |
| 24.0 | 18.0 |

Comparative Example 7

The comparative example 7 is different from the comparative example 6 in that, in a mercury-removal adsorbent, the alumina support similar to that of the example 6 carried metal sulfide (major component: molybdenum sulfide) which has a time-proven advantage for commercial adsorptive removal of mercury. Further, mercury in liquid hydrocarbon was organic mercury, and its concentration was set to 52.0 wtppb. Table 28 shows properties of the mercury-removal adsorbent of the comparative example 7, and Table 29 shows the test result.

As is seen from Table 29, the mercury-removal adsorbent used in the comparative example 7 was unable to lower the concentration of organic mercury to the specification value within 24 hours, and was evaluated as "poor". It is understood that a carried substance designed mainly for removing elemental mercury, even though having a time-proven commercial advantage, is not suitable for removing mercury in a form such as organic mercury.

TABLE 28

Properties of Mercury-Removal Adsorbent of Comparative Example 7

| | |
|---|---|
| support type | alumina |
| support size | trilobe form ½ inch |
| carried substance | molybdenum sulfide ($MoS_2$) |
| pore surface area of support (after carriage) | 180 $m^2$/g |
| amount of molybdenum sulfide carried | 10 wt % |
| pore volume of support (Total) | 0.5 mL/g |
| pore volume of adsorbent (1 μm pore diameter or more) | 0.1 mL/g |
| pore volume of support (1 μm pore diameter or more) | 0.2 mL/g |

TABLE 29

Test Result of Comparative Example 7

| elapsed time (hr) | concentration of organic mercury (wtppb) |
|---|---|
| 0.0 | 52.0 |
| 5.0 | 50.0 |
| 10.0 | 48.0 |
| 24.0 | 45.0 |

Comparative Example 8

A test was conducted in the following manner: mercury-removal adsorbent including an alumina support carrying copper sulfide was filled in a column, and heavy naphtha was passed therethrough. The column and heavy naphtha used here are the same as those used in the example 13. Table 30 shows properties of the mercury-removal adsorbent used in the test. The adsorbent including the alumina support carrying copper sulfide, which was used in this comparative example, is often used for removing elemental mercury.

About six months later, the mercury concentration of heavy naphtha flowing out from the column was 1 wtppm, but a transition rate of a breakpoint (position at which the concentration of mercury in the processed liquid reaches the specification value) in the column was twice or more as high as that in the example 13, and thus this mercury-removal adsorbent was not suitable for practical use.

TABLE 30

Properties of Mercury-Removal Adsorbent of Comparative Example 8

| | |
|---|---|
| support type | alumina |
| support shape | spherical |
| carried substance | copper sulfide |
| amount of copper sulfide carried | 10 wt % |
| pore surface area of support (after carriage) | 226 $m^2$/g |
| pore volume of support (Total) | 0.6 mL/g |
| pore volume of adsorbent (1 μm pore diameter or more) | 0.1 mL/g |
| pore volume of support (1 μm pore diameter or more) | 0.1 mL/g |

C. Test Results and Conclusion

The test results of the examples and comparative examples are summarized in Table 31.

TABLE 31

| | properties of adsorbent | | | | | test | | |
|---|---|---|---|---|---|---|---|---|
| | support type | activation method | carried substance | concentration of carried substance (wt %) | volume of pores with 1 μm pore diameter or more (mL/g) | test method | mercury form | evaluation |
| example 1 | wooden | zinc chloride | KI | 33 | 0.9 | batch | organic mercury | excellent |
| example 2 | wooden | zinc chloride | KI | 34 | 0.9 | batch | organic mercury | good |
| example 3 | wooden | steam | KI | 34 | 0.9 | batch | organic mercury | excellent |
| example 4 | coconut shell | zinc chloride | KI | 34 | 0.9 | batch | organic mercury | excellent |
| example 5 | coconut shell | zinc chloride | KI | 34 | 0.9 | batch | ionic mercury | excellent |
| example 6 | wooden | zinc chloride | KI | 33 | 0.9 | batch | ionic mercury | excellent |
| example 7 | wooden | zinc chloride | KI | 33 | 0.9 | batch | elemental mercury | excellent |
| example 8 | wooden | zinc chloride | KI | 45 | 0.8 | batch | organic mercury | excellent |
| example 9 | wooden | zinc chloride | KI | 52 | 0.7 | batch | organic mercury | excellent |
| example 10 | wooden | zinc chloride | KI | 60 | 0.7 | batch | organic mercury | good |
| example 11 | wooden | zinc chloride | KI | 70 | 0.6 | batch | organic mercury | good |
| example 12 | wooden | zinc chloride | KI | 80 | 0.5 | batch | organic mercury | poor |
| example 13 | wooden | zinc chloride | KI | 33 | 0.9 | column | mixture | excellent |
| example 14 | wooden | zinc chloride | KI | 25 | 0.9 | batch | organic mercury | good |
| example 15 | wooden | zinc chloride | KI | 15 | 1.0 | batch | organic mercury | good |

TABLE 31-continued

| | support type | activation method | carried substance | concentration of carried substance (wt %) | volume of pores with 1 μm pore diameter or more (mL/g) | test method | test mercury form | evaluation |
|---|---|---|---|---|---|---|---|---|
| example 16 | wooden | zinc chloride | KI | 5.5 | 1.1 | batch | organic mercury | good |
| comparative example 1 | coal | steam | KI | 34 | 0.1 | batch | organic mercury | poor |
| comparative example 2 | coal | steam | KI | 30 | 0.2 | batch | organic mercury | poor |
| comparative example 3 | coconut shell | steam | KI | 34 | 0.1 | batch | organic mercury | poor |
| comparative example 4 | coconut shell | steam | KI | 34 | 0.2 | batch | organic mercury | poor |
| comparative example 5 | wooden | zinc chloride | NaI | 33 | 0.9 | batch | organic mercury | poor |
| comparative example 6 | alumina | — | KI | 8 | 0.1 | batch | organic mercury | poor |
| comparative example 7 | alumina | — | MoS2 | 10 | 0.1 | batch | organic mercury | poor |
| comparative example 8 | alumina | — | CuS | 10 | 0.1 | batch | mixture | poor |

As is understood from the summarized results in Table 31, in a case where the activated carbon support carries potassium iodide in an amount of 5 to 70% of the total adsorbent weight and a volume of pores with a 1 μg/m pore diameter or more in the mercury-removal adsorbent is 0.6 mL/g or more, the mercury-removal adsorbent can be evaluated as "excellent to good" even if mercury is organic mercury, ionic mercury, or the like irrespective of the state of mercury. Here, it can be thought that sufficient mercury adsorption performance cannot be obtained if an amount of potassium iodide carried is less than 5% of the total adsorbent weight.

(Life Evaluation Test of Mercury Adsorbents)

A. Preconditions of the Test

The life evaluation of mercury-removal adsorbents was conducted in the following manner: mercury-removal adsorbents with varied amounts of potassium iodide carried was filled in columns, liquid hydrocarbon containing mercury was passed therethrough, and a rate at which a breakpoint (position at which the concentration of mercury in a processed liquid reaches the specification value) in the adsorbent layer moves to a downstream side of the column (hereinafter, referred to as breakpoint transition rate) was measured. Table 32 shows test conditions. The mercury-removal adsorbents used in the test were the same as that shown in Table 3 except in that an amount of potassium iodide carried was varied.

TABLE 32

Test Conditions

| test method | column test |
|---|---|
| hydrocarbon | n-hexane |
| mercury form | elemental mercury |
| concentration of mercury (wtppb) | 400 |
| column inside diameter (mm) | 10 |
| column length (mm) | 1,200 |
| liquid superficial velocity (cm/sec) | 1.5 |
| temperature (° C.) | 22-25 |
| pressure (kPa-G) | 100 |

B. Examples and Comparative Examples

Example 2-1

An amount of potassium iodide carried was set to 27% of the total adsorbent weight. Table 33 shows the test result.

Example 2-2

An amount of potassium iodide carried was set to 33% of the total adsorbent weight. Table 33 shows the test result.

Example 2-3

An amount of potassium iodide carried was set to 40% of the total adsorbent weight. Table 33 shows the test result.

Comparative Example 2-1

An amount of potassium iodide carried was set to 15% of the total adsorbent weight. Table 34 shows the test result.

Comparative Example 2-2

An amount of potassium iodide carried was set to 20% of the total adsorbent weight. Table 34 shows the test result.

Comparative Example 2-3

An amount of potassium iodide carried was set to 23% of the total adsorbent weight. Table 34 shows the test result.

Comparative Example 2-4

An amount of potassium iodide carried was set to 25% of the total adsorbent weight. Table 34 shows the test result.

TABLE 33

Test Results of Example 2-1 to Example 2-3

|  | example 2-1 | example 2-2 | example 2-3 |
|---|---|---|---|
| amount of potassium iodide carried (wt %) | 27 | 33 | 40 |
| breakpoint transition rate (cm/day) | 0.48 | 0.41 | 0.38 |

TABLE 34

Test Results of Comparative Example 2-1 to Comparative Example 2-4

|  | comparative example 2-1 | comparative example 2-2 | comparative example 2-3 | comparative example 2-4 |
|---|---|---|---|---|
| amount of potassium iodide carried | 15 | 20 | 23 | 25 |
| breakpoint transition rate (cm/day) | 2.7 | 1.5 | 1.2 | 0.76 |

C. Test Results and Conclusion

As is seen from the test results in Table 33, in the example 2-1 to the example 2-3, in accordance with an increase in an amount of potassium iodide carried, the breakpoint transition rate becomes lower and the life of the mercury-removal adsorbents increases. On the other hand, as is seen from the test results of the comparative examples shown in Table 34, the breakpoint transition rate abruptly increases in the comparative example 2-4 in which an amount of potassium iodide carried is smaller than that in the example 2-1 by 2%, and in accordance with a further decrease in an amount of potassium iodide carried, the breakpoint transition rate further increases (the comparative example 2-1 to the comparative example 2-3). Therefore, in view of the life of the mercury-removal adsorbent, it can be said that a preferable amount of potassium iodide carried is 27% or more of the total adsorbent weight.

The invention claimed is:

1. A mercury-removal adsorbent comprising a wood based activated carbon support or a coconut shell-based activated carbon support, from a raw material selected from a wood-based material and a coconut shell-based material, the support carrying potassium iodide to remove mercury by adsorption, wherein:

an amount of the potassium iodide carrier is 33 to 70% of a total adsorbent weight; and a volume of pores measured after adding the potassium iodide with a 1 micrometer pore diameter or more in the mercury-removal adsorbent is 0.6 mL/g or more in total pore volume.

2. A method of producing a mercury-removal adsorbent comprising the steps of:

making an activated carbon support from a raw material selected from a wood-based material and a coconut shell-based material by practicing an activated carbon activation method on the raw material, whereby an activated carbon support is produced having at least a 1.0 mL/g volume of pores with at least a 1 μm pore diameter in total pore volume, impregnating potassium iodide in the activated carbon support in an amount that is 33 to 70% of total weight of the resulting adsorbent, whereby the resulting volume of pores having at least a 1 μm pore diameter in the adsorbent is at least 0.6 mL/g in total pore volume, the adsorbent being capable of removing mercury by adsorption.

3. A method of removing mercury by adsorption from liquid or gas containing the mercury, the method comprising a mercury removal step of removing the mercury by adsorption from the gas or the liquid by using the mercury-removal adsorbent according to claim 1.

4. The method of adsorptively removing mercury according to claim 3, wherein the liquid is hydrocarbon, and the method further comprises a dehydration step of removing water contained in the hydrocarbon from the hydrocarbon, and wherein in said mercury removal step, the mercury is removed from the hydrocarbon by adsorption from which the water is removed in said dehydration step.

5. The method of removing mercury by adsorption according to claim 4, wherein said dehydration step removes the water to lower water concentration in the hydrocarbon.

6. The method of removing mercury by adsorption according to claim 4 or claim 5, further comprising an effluence removal step of removing an effluence which originates from the potassium iodide carried on the activated carbon support and flows into the hydrocarbon from the mercury-removal adsorbent in the mercury removal step.

7. The method of removing mercury by adsorption according to claim 6, wherein the hydrocarbon from which the mercury is removed by adsorption in the mercury removal step is subjected to the effluence removal step until a predetermined timing after the use of the mercury-removal adsorbent is started, and the effluence removal step is stopped after the predetermined timing.

* * * * *

UNITED STATES PATENT AND TRADEMARK OFFICE
CERTIFICATE OF CORRECTION

PATENT NO. : 8,598,072 B2  
APPLICATION NO. : 12/312993  
DATED : December 3, 2013  
INVENTOR(S) : Kazuo Sato et al.

Page 1 of 1

It is certified that error appears in the above-identified patent and that said Letters Patent is hereby corrected as shown below:

In the Claims

Col. 23 (claim 1): at line 45 change "wood based" to -- wood-based --.

Col. 24 (claim 1): at line 1 change "the potassium iodide carrier is" to -- the potassium iodide carried is --; at line 4 change "1 micrometer" to -- 1 μm --.

Signed and Sealed this  
Twenty-second Day of April, 2014

Michelle K. Lee  
*Deputy Director of the United States Patent and Trademark Office*